United States Patent [19]

Moritz

[11] Patent Number: 4,800,714
[45] Date of Patent: Jan. 31, 1989

[54] GUIDE CHAIN
[75] Inventor: Werner Moritz, Siegen, Fed. Rep. of Germany
[73] Assignee: Kabelschlepp GmbH, Siegen, Fed. Rep. of Germany
[21] Appl. No.: 52,833
[22] Filed: May 21, 1987
[30] Foreign Application Priority Data

May 23, 1986 [DE] Fed. Rep. of Germany ....... 3617447

[51] Int. Cl.4 .............................................. F16G 13/16
[52] U.S. Cl. ...................................... 59/78.1; 59/900; 248/49
[58] Field of Search ...................... 59/78.1, 78; 248/49, 248/51, 52, 68 R

[56] References Cited

U.S. PATENT DOCUMENTS

| | | | |
|---|---|---|---|
| 3,382,668 | 5/1968 | Berkes | 59/78.1 |
| 3,779,003 | 12/1973 | Boissevain | 59/78.1 |
| 4,392,344 | 7/1983 | Gordon et al. | 59/78.1 |
| 4,570,437 | 2/1986 | Moritz | 59/78.1 |
| 4,590,961 | 5/1986 | Schumann | 59/78.1 |

FOREIGN PATENT DOCUMENTS

| | | |
|---|---|---|
| 1273952 | 7/1968 | Fed. Rep. of Germany ....... 59/78.1 |
| 1574369 | 8/1971 | Fed. Rep. of Germany . |
| 2358451 | 1/1975 | Fed. Rep. of Germany . |
| 2415374 | 10/1975 | Fed. Rep. of Germany . |
| 2656638 | 6/1978 | Fed. Rep. of Germany . |
| 3121912 | 12/1982 | Fed. Rep. of Germany . |
| 3333543 | 4/1985 | Fed. Rep. of Germany . |
| 3407169 | 9/1985 | Fed. Rep. of Germany . |
| 2374761 | 7/1978 | France . |

*Primary Examiner*—David Jones
*Attorney, Agent, or Firm*—Becker & Becker Inc.

[57] ABSTRACT

A guide chain for carrying lines that supply all types of expendable material from a fixed connection to a movable consuming device. In order to provide the guide chain with a periphery that is as completely closed as possible and has as smooth a surface as possible, and in order to be able to assemble the individual parts in a straightforward manner, two basic variants are proposed. In one variant, recesses are provided in the side pieces and are respectively concentric to a pivot axis between that side piece and an adjacent side piece, with externally circular cylindrical cover elements being inserted in the recesses to cover horizontal gaps between adjacent chain links. Caps are provided to connect adjacent side pieces, with each cap having a concentric rim that extends into the recesses and grooves that interconnect the latter. Each cap also has projecting members that are disposed between stops of adjacent chain links. These projecting members limit the maximum pivot angle of adjacent chain links.

13 Claims, 6 Drawing Sheets

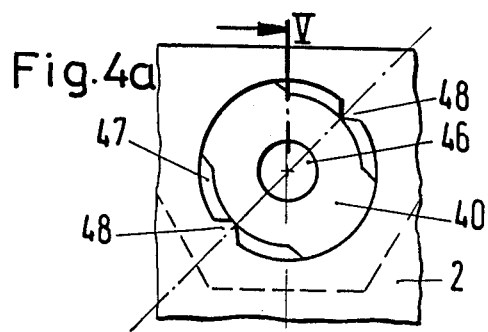
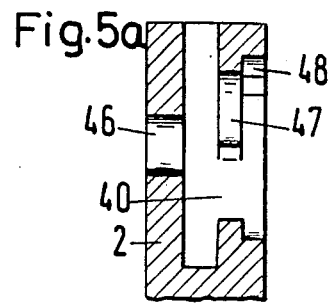
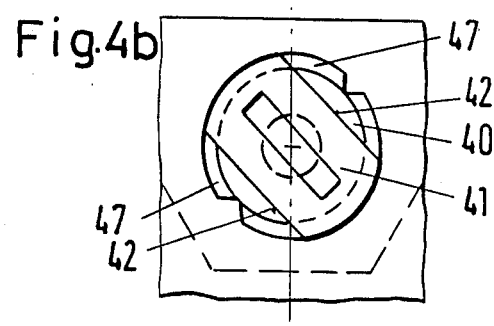
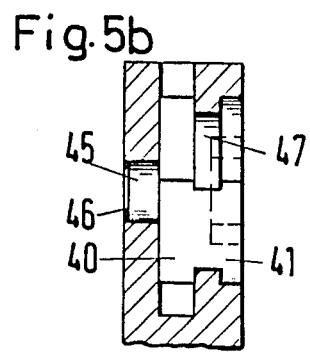
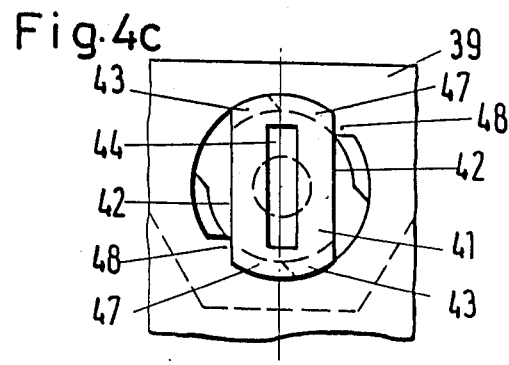
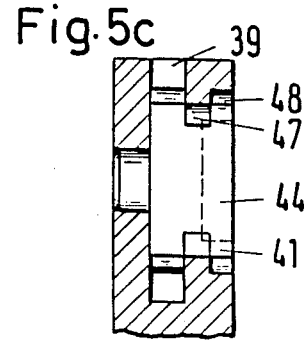
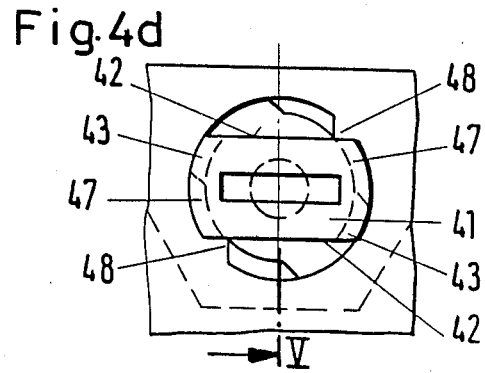
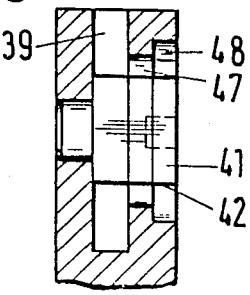

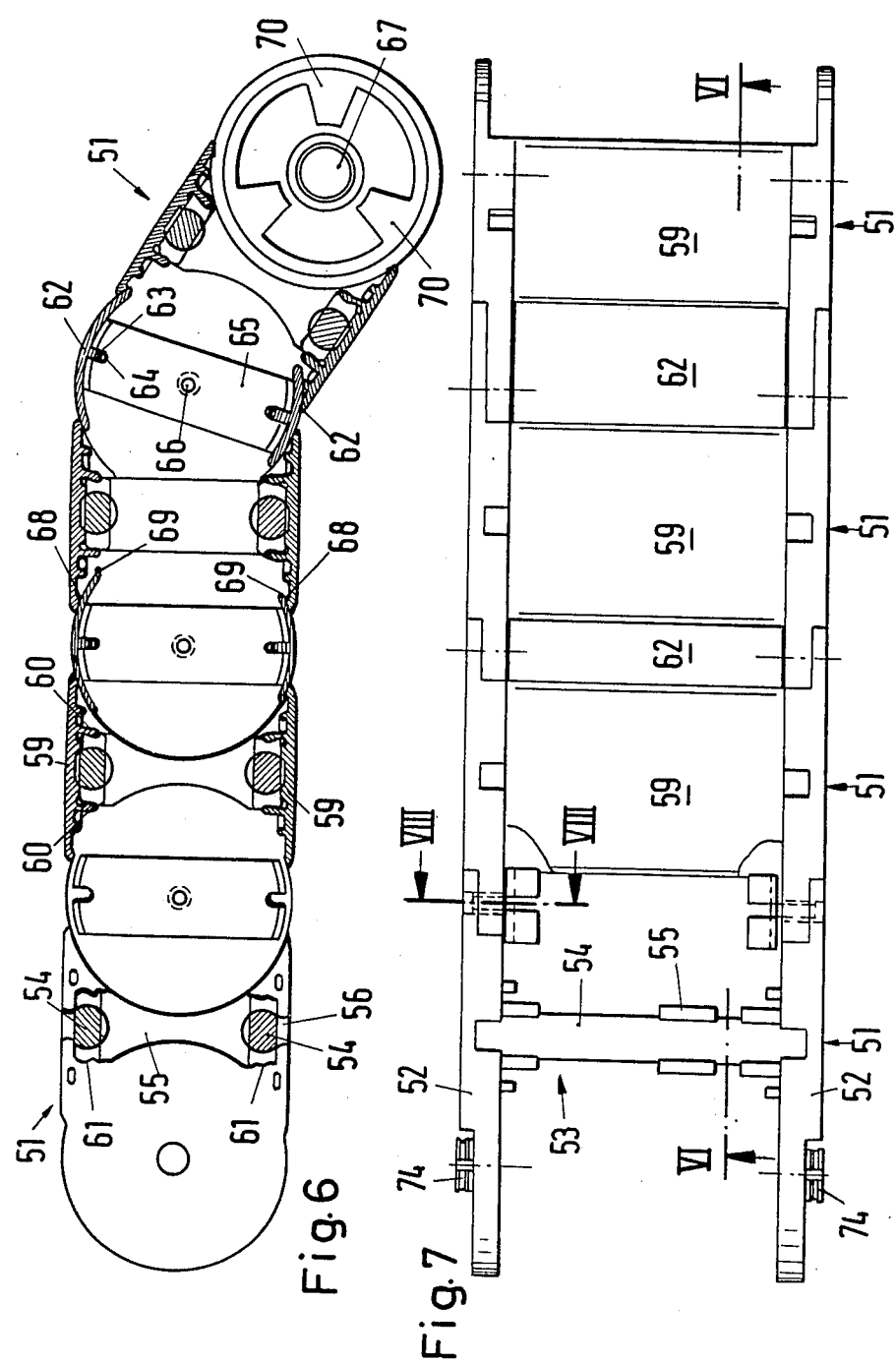

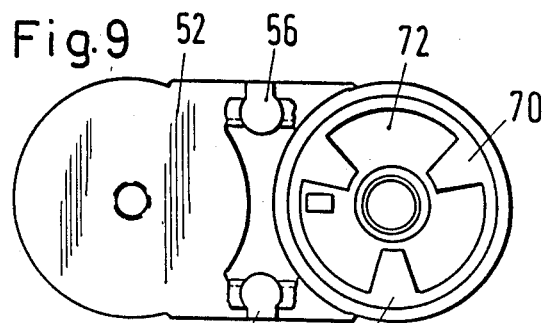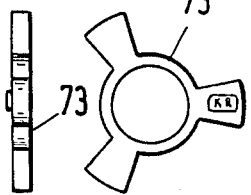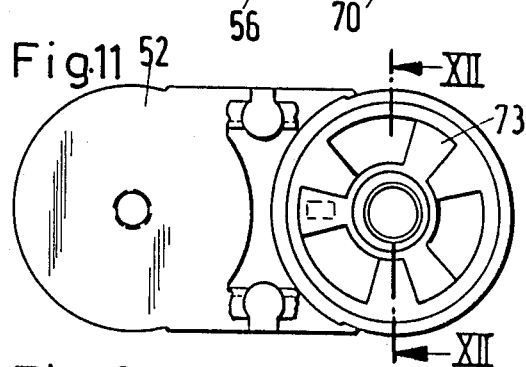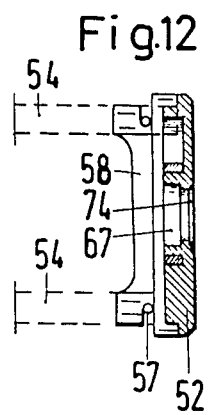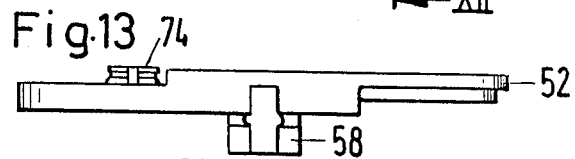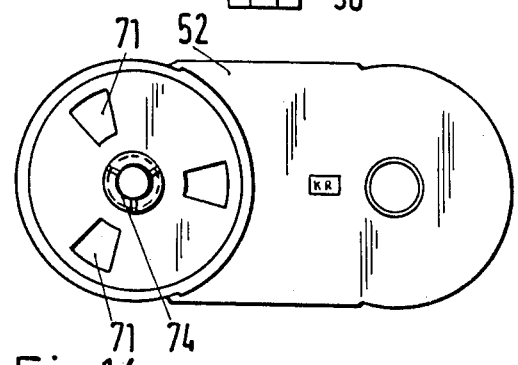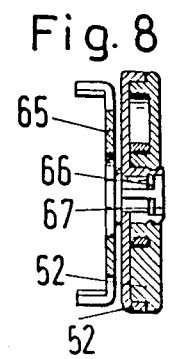

1

GUIDE CHAIN

BACKGROUND OF THE INVENTION

The present invention relates to a guide chain for carrying lines, e.g. transmission lines, feed lines, and other energy lines, that supply all types of expendable material from a fixed connection to a movable consuming device. The chain includes pivotably interconnected chain links, each of which comprises side pieces and crosspieces that interconnect the latter, with the side pieces and crosspieces delimiting an interior space for accommodating said lines. The pivot movement of adjacent chain links is limited by radial stops that are pivotable in a given plane with cooperating stops of an adjacent chain link.

German Offenlegungsschrift No. 33 33 543 Klein dated Apr. 18, 1945 discloses a self-supporting carrier for energy lines that is made of hingedly interconnected tubular members, the tubular ends of which have mutually overlapping edge portions that interlock with one another; also, the faces of the tubular members form surfaces of rotation that are concentric to the pivot axes. The pivot axes are defined by raised portions on the tubular members, with these raised portions being rounded-off on one side, and extending into cooperating recesses of adjacent tubular members, with the pivot angle being limited by an elongated extension. With this heretofore known carrier for energy lines, the connections of the energy lines must be disconnected if a defective tubular member has to be replaced. Furthermore, with this known carrier it is difficult to insert energy lines, to replace individual energy lines, or to insert energy lines having fixed fittings. A further drawback is that the tubular members must be relatively thick if small radii of curvature are to be realized. Finally, the pressure on the pivot shafts is particularly great, so that no great forces can be transmitted.

U.S. Pat. No. 4,392,344 Gordon dated July 12, 1983 discloses a further closed guide chain that comprises hingedly interconnected, tubular chain links. The openings between the pivoted chain links are covered by an inserted metal strip. It is not possible to transmit particularly great forces with this known guide chain. Furthermore, the replacement of individual chain links and the exchange of energy lines must be carried out in a complicated manner. Finally, the sharp edges of the metal strips can lead to injury or damage during assembly.

It is therefore an object of the present invention to provide an improved guide chain that can transmit high forces, has a closed surface that is as smooth as possible, and is as easy to assemble as possible.

BRIEF DESCRIPTION OF THE DRAWINGS

This object, and other objects and advantages of the present invention, will appear more clearly from the following specification in conjunction with the accompanying schematic drawings, in which:

FIGS. 4a to 4d inclusive are views that show the attachment of the cross pieces to the side pieces without bolts (4a), with the bolt inserted (4b), with the bolt in a position ready to receive the attachment tab (4c), and with the bolt in the locking position (4d);

FIGS. 5a to 5d inclusive are cross-sectional views showing the attachment of the crosspieces to the side pieces, and are taken along the lines V—V in FIGS. 4a to 4d;

FIG. 6 is a view that shows four chain links of a second exemplary inventive variant, and is taken along the line VI—VI in FIG. 7;

FIG. 7 is a plan view of the chain links of FIG. 6;

FIG. 8 is a cross-sectional view of the pivot connection of the side pieces and is taken along the line VIII—VIII in FIG. 7;

FIG. 9 is a side view of a chain link;

FIG. 10 is a plan view and side view of a star-shaped structural element for altering the radius of curvature;

FIG. 11 is a side view of a side piece having disposed therein the structural element for altering the radius of curvature;

FIG. 12 is a cross-sectional view of the side piece of FIG. 11 taken along the line XII—XII;

FIG. 13 is a plan view of the side piece of FIGS. 9 and 11;

FIG. 14 is a side view of the side piece of FIGS. 9 and 11 taken from the other side;

SUMMARY OF THE INVENTION

Figure 1:
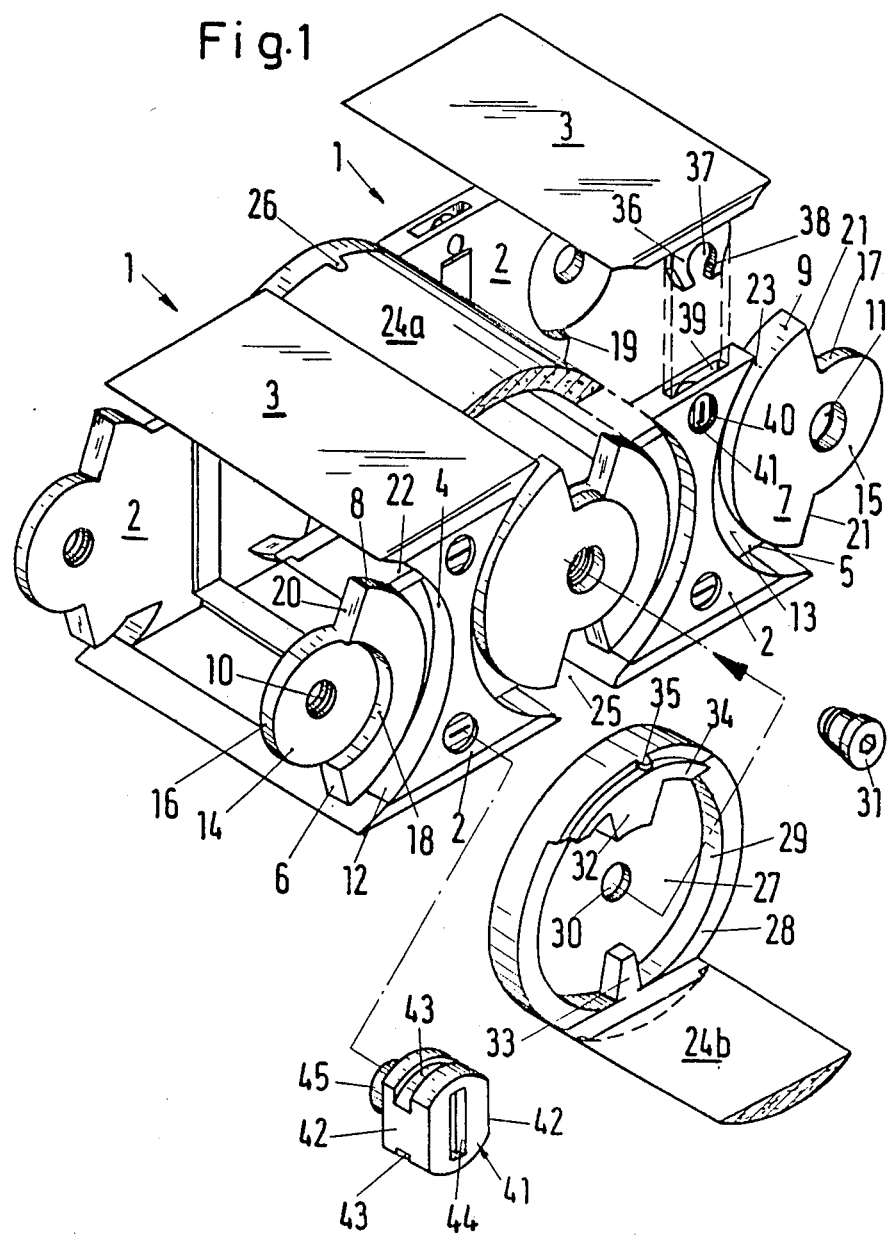
FIG. 1 is a perspective exploded view showing two chain links of a first exemplary inventive variant.

Pursuant to a first inventive variant, recesses are provided in the side pieces and are respectively concentric to a pivot axis between that side piece and an adjacent side piece, with externally circular cylindrical cover elements being inserted in the recesses to cover horizontal gaps between adjacent chain links; caps are also provided to connect adjacent side pieces, with each cap having a concentric rim that extends into the recesses and their interconnecting grooves in the side pieces; each cap also has projecting members that are disposed between the stops of adjacent chain links.

With an inventive guide chain of this type, the chain links are held together by caps. In this way, particularly great forces can be transmitted, since the caps are attached particularly advantageously to the chain links and themselves have a high rigidity due to their construction. When the stops of adjacent side pieces rest against one another, the forces are transmitted not only via the stops, but also via the peripheral surfaces of the raised portions and via the rim of the cap; this results in a considerable increase in strength relative to the heretofore known guide chains. In addition, the cap has a sealing function. This is because on the one hand the cap covers the gap between the side pieces, especially between the stops. On the other hand, the cap also covers the recesses in the side pieces, with these recesses generally being filled only partially by the cover elements. The latter are preferably dimensioned such that they cover the space between adjacent chain links in every position in the recesses, even when the maximum pivot angle has been attained or reached between the chain links. The projecting members on the caps are disposed between the stops of adjacent chain links and limit the movement thereof, as a result of which the radii of curvature of the guide chain, and the preload between the chain links, can also be subsequently fixed or varied, in which connection it is merely necessary to use different caps. The projecting members of the caps limit the movement range of the stops, thus fixing the maximum pivot angle of adjacent chain links. In addition, the projecting members center the cover elements between the crosspieces.

Pursuant to one practical embodiment of this inventive variant, the raised portions are disposed on the base of a recessed portion of the side pieces, with adjacent grooves for receiving the rim of the caps being provided on the concentric peripheral surfaces, and with the caps being flush on the outside with the side pieces. In this way, the sides of the guide chain are also provided with a smooth surface. The grooves can be embodied in such a way that the chain links pivot, the outer sides of the grooves of the side pieces are supported on the peripheral surface of the rim of the cap.

In a further practical inventive embodiment, adjacent side pieces overlap one another in overlapping portions, with the latter and the cap having holes that are concentric to the pivot axes of the chain links for accommodating connection elements, such as pivot pins, so that on the one hand the chain links can be guided and supported particularly well against one another, and on the other hand the cap can be connected especially reliably and at the same time easily with the chain links. With this inventive embodiment, the exchange or replacement of individual chain links is particularly easy.

In another practical inventive embodiment, the caps form tongue and groove joints with the cover elements, so that the latter cannot twist in the recesses of the side pieces. This is achieved in particular when the cap is moved by the stops on the projecting members. In this way, cover elements having relatively small dimensions can be used. To improve the connection, the caps can also have rims for supporting the cover elements.

In yet another practical embodiment, those cover elements that are disposed externally when the guide chain is curved have the cross-sectional shape of a portion of a circular ring, so that large radii of curvature can also be realized with thin cover elements. Those cover elements that are disposed inwardly when the guide chain is curved can have the cross-sectional shape of a circular sector, so that for all practical purposes they do not extend into the interior designed for the energy lines.

In a further practical inventive embodiment, the chain links, between the cover elements, have crosspieces that can be disconnected on one or both sides, and that extend all the way to the cover elements, so that the guide chain can be opened in a straightforward manner and chain links or energy lines can be introduced or replaced in a simple manner.

In another practical inventive embodiment, the crosspieces are provided with attachment tabs, the cutouts of which are provided with back tapers, with the side pieces having receiving means for the insertion of the attachment tabs. The receiving means have transverse bores into which securing bolts are inserted, with the attachment tabs and their cutouts being adapted to be pushed over the flattened sides of the securing bolt. After being rotated, the securing bolts interlock with the back tapers in the attachment tabs and projecting portions in the transverse bores. In this way, the crosspieces can be positively connected with the side pieces in a straightforward manner. For locking purposes, the securing bolts on their outer periphery can have a groove into which projecting portions on the inner periphery of the transverse bore extend.

In a final practical inventive embodiment of this variant, the flattened sides of the securing bolts can be pushed over the projecting portions on the inner periphery of the transverse bores, so that the bolts can be easily inserted into the transverse bores. Since the flattened sides of the securing bolts are inclined at an angle 45° to the axis of introduction of the attachment tabs if they are to pushed over the projecting portions, the securing bolts are nondetachably connected with the side pieces in the receiving position and in the locking position.

Pursuant to a second exemplary inventive variant, the chain links are provided with transverse elements that can be placed on, or are formed by, the crosspieces to cover the chain links; circular cylindrical cover elements are inserted between the transverse elements of adjacent chain links, with support elements being provided for connecting the cover elements of a given chain link. These cover elements are disposed radially relative to the pivot axes of the chain links, and have a central shaft that is adapted to be mounted in a pivot hole of the side pieces.

With this inventive embodiment of the guide chain, the chain links are held together by their side pieces, which in their pivot regions are provided at one end and on one side with clearances that are interrupted by radial stops; at the other end, and on the opposite side, the side pieces are provided with projecting, radial stops that can extend into those clearances of an adjacent chain link disposed between the stops. With this type of pivot construction of the side pieces, the stops are disposed on the inside and no longer have to be covered by a cap. The top and bottom sides of the chain links are closed off by the transverse elements that can be placed on the crosspieces or that are formed integrally therewith. The gaps that are disposed between these transverse elements and that open and close in the curvature region, are closed off by the circular cylindrical cover elements the support elements of which are mounted in the pivot holes of the side pieces. This inventive solution has the advantage of a particularly straightforward and reliable construction, the individual components of which can be made of plastic and can be mechanically assembled.

Pursuant to one practical embodiment, the transverse elements are made of extruded profiled plastic on which resilient tongues are formed placement on the crosspieces or on separators disposed between the crosspieces. The cover elements can also be extruded profiled plastic parts on which are formed clamping projections are formed, so that these two structural parts can be produced as goods having a length of several meters, and can be cut to a definite length for producing guide chains of various widths.

In another practical inventive embodiment, interengaging guide edges are formed on the edges of the transverse elements and cover elements. With these guide edges, the cover elements are centered between the transverse elements, so that even during movement in the curvature region, no gaps can open and close.

Pursuant to yet another practical inventive embodiment, the support elements are pivotably secured in the pivot holes of the side pieces via a snap shaft. The latter can at the same time also form the pivot shaft for adjacent chain links.

In both inventive variants, the inventive guide chain is distinguished by its ease of manufacture, and by a high degree of variability. The inventive guide chain is particularly easy to assemble and service, with a contributing factor being that it is composed of only a few parts, and has a symmetrical construction.

Pursuant to a third exemplary inventive variant, the chain links are covered by transverse elements that can be placed on, or be formed by, the crosspieces, with a circular cylindrical cover element being formed on the transverse elements on one longitudinal edge thereof.

With this inventive guide chain, the chain links are also held together by their side pieces, as was described above in connection with the second inventive variant. However, this third variant has the further advantage as compared to the second variant that the support elements for the transverse elements can be eliminated, because the transverse elements via the cover elements formed thereon can center themselves in the gaps between adjacent chain links if, as was the case with the second inventive variant, interengaging guide edges are formed on the free edges of the transverse elements and of the cover elements. It should be noted that this particular inventive variant can be used only for guide chains having very small chain links and relatively large radii of curvature.

With this inventive embodiment also, the transverse elements and cover elements can be made of extruded profiled plastic on which resilient tongues are formed for placement onto the crosspieces or onto separators disposed between the crosspieces. Furthermore, supporting strips can be formed on the inside of the side pieces for the cover elements.

Further specific features of the present invention will be described in detail subsequently.

DESCRIPTION OF PREFERRED EMBODIMENTS

Referring now to the drawings in detail, FIGS. 1 to 5 illustrate a first inventive variant. FIG. 1 shows chain links 1 that are symmetrically constructed of side pieces 2 and crosspieces 3. Thus, for the construction of this particular guide chain, only one type of side piece 2 and one type of crosspiece 3 are required. The side pieces 2 are provided at the ends with recessed portions 4, 5, at the bottoms of which are disposed elevations or raised portions 6, 7, the peripheral surfaces 8, 9 of which are concentric to the pivot axes of the chain links; these pivot axes are defined by the central axes of the holes 10, 11. Grooves 12, 13 are disposed adjacent to the peripheral surfaces 8, 9.

The side pieces 2 are furthermore provided at the ends with overlapping portions 14, 15, which have outer surfaces 16, 17 that are concentric to the pivot axes of the chain links, and that are disposed within complementarily shaped cooperating surfaces 18, 19 of adjacent chain links; the overlapping portions 14, 15 of adjacent chain links overlap one another. The radial limitations of the peripheral surfaces 8, 9 form stops 20, 21, with each stop 20 being pivotable in the same plane as the stop 21 of an adjacent chain link.

The edges of the side pieces 2 have recesses 22, 23 that are concentric to the pivot axes and in which are inserted externally circular-cylindrical cover elements 24a and 24b to cover the gaps 25 between adjacent chain links. The cover elements 24a and 24b form tongue and groove joints 26 with caps 27 that are secured to the side pieces 2.

The cover element 24a that is disposed outwardly when the guide chain is curved (in FIG. 1, the upper cover element), has the crosssectional shape of a portion of a circular ring. The cover element 24b that is disposed inwardly when the guide chain is curved (the lower cover element in FIG. 1), has a cross-sectional shape of a circular sector.

The caps 27 connect adjacent side pieces 2 in that the rims 28 of the caps 27 encircle the peripheral surfaces 8, 9 of the raised portions 6, 7. In this connection, the rim 28 of the cap 27 is inserted into the grooves 12, 13, so that the outside of the cap 27 is flush with the side pieces 2, and the inner surface 29 of the rim 28 supports the peripheral surfaces 8, 9. To secure the cap 27, a pivot pin 31 is provided that can be inserted into a central hole 30 and that connects the cap 27 with the overlapping portions 14, 15. Since the pivot pin 31 does not serve to transmit force but rather only serves a centering function and thus is not loaded. The pivot pin 31 can be in the form of a screw, a journal bolt that has a securing ring, or a snap connection.

The cap 27 is provided with stops 32, 33. The dimensions of the stop 32 determine the preload of the chain links in the extended state, and dimensions of the stop 33 determine the radius of curvature of the guide chain by fixing the minimum distance between the stops 20, 21. The cap 27 is furthermore provided with a second rim 34 for supporting the cover elements 24 and on which is disposed the tongue 35 of the tongue and groove joint 26.

The crosspieces 3 are detachably connected to the side pieces 2 via attachment tabs 36 that are provided with cutouts 37 having back tapers 38. The side pieces 2 are provided with receiving means 39 for the attachment tabs 36, with securing bolts 41 being placed in transverse bores 40 of the receiving means 39. The securing bolts 41 have flat sides 42, and on their outer periphery are provided with groves 43. To operate the securing bolt 41, one end face thereof is provided with a slot 44, for example for receiving a screwdriver, and the other end face is provided with a guide pin 45. The cooperation between the securing bolts 41 and the attachment tabs 36 will be described subsequently in connection with FIGS. 4a to 5d.

Figure 2:
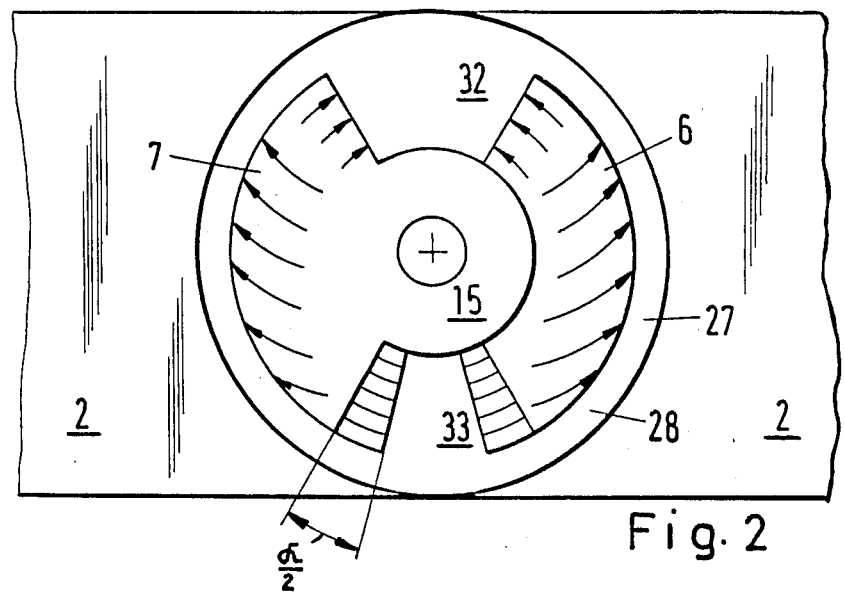
FIG. 2 is a view which provides schematic illustration of the connection between two side pieces when the guide chain is in an extended state, with the direction of transmitted forces being shown vectorially.
Figure 3:
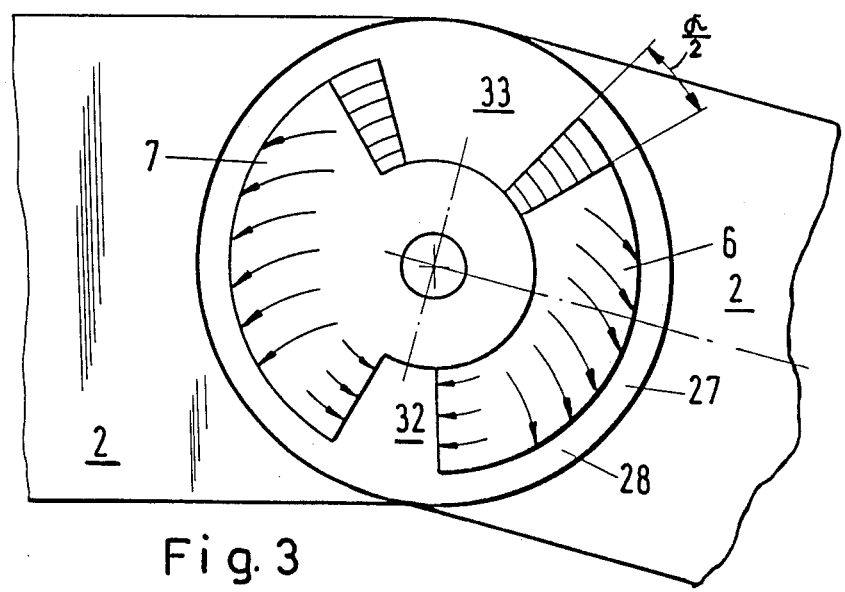
FIG. 3 is a view which provides schematic illustration of the connection between two side pieces at a maximum pivot angle, with the direction of transmitted forces again being shown vectorially.

As the arrows in FIG. 2 indicate, the stresses between extended side pieces 2 are introduced relatively uniformly via the raised portions 6, 7 into the rim 28 and the stop 32 of the cap 27, so that the material used is subjected to relatively little stress. By pivoting the right side piece 2 about the angle $\alpha$, the configuration illustrated in FIG. 3 is obtained, where the force from the stops 20, 21 is introduced into the rim 28 and the stop 33 of the cap 27.

FIGS. 4a and 5a show the transverse bore 40 in the side piece 2 prior to introduction of the securing bolt 41. The base of the transverse bore 40 is provided with a guide hole 46 for the guide pin 45 of the securing bolt 41. The inner periphery of the transverse bore 40 is provided with projecting portions 47 and stops 48.

FIGS. 4b and 5b show the transverse bore 40 with a securing bolt 41 inserted therein. The flat sides 42 of the bolt 41 can just pass through the opening between the projecting portions 47, and at the same time they have an angular orientation of 45° to the axis of introduction of the attachment tabs 36. The guide pin 45 is pressed into the guide hole 46. In this position, the securing bolt 41 can be removed from or inserted into the transverse bore 40.

FIGS. 4c and 5c show the securing bolt 41 after it has been turned, via the slot 44, into a non-detachable position in which the projecting portions 47 extend partially into the grooves 43 of the bolt 41, and in which the flat sides 42 rest against the stops 48, thus preventing the bolt 41 from turning any further on its own. In this position the attachment tab 36 can be inserted into the receiving means 39, because the cutout 37 fits exactly over the flat sides 42 of the bolt 41.

FIGS. 4d and 5d show the securing bolt 41 in the locking position, which it has achieved by being turned counterclockwise from the previously indicated position. In this locking position, the projecting portions 47 also extend partially into the groove 43, and the flat sides 42 rest against these stops 48, thus securing the bolt 41. The spherical portion of the securing bolt 41 is now disposed in the receiving means 39 transverse to the direction of movement of the attachment tab 36, as a result of which the bolt 41 can lock the attachment tab 36 in the receiving means 39 via the back taper 38 of the tab 36. By slightly spreading the attachment tab 36, a spring tension can be produced that secures the bolt 41 in the locking position.

FIGS. 6 to 14 illustrate a second inventive variant. Each chain link 51 comprises two identical side pieces 52, and a crosspiece 53 that interconnects them. The crosspiece 53, in turn, is formed by an upper and lower cross bar 54, and separators 55.

The cross bars 54 comprise rods that are flattened on two sides, and are rounded-off on the other two sides. These rods are placed in backtapered cutouts 56 of the side pieces 52 and can be secured in the latter by being rotated by 90°. In so doing, pins 57 of the cross bars 54 extend into slots of end pieces 58 so that the side pieces 52 cannot be pulled off of the cross bars 54 from the outside.

The separators 55 are fixed to the cross bars 54, and serve at the same time as support elements for transverse elements 59. Resilient tongues 60 formed on the transverse elements 59 extend into longitudinal grooves 61 on the separators 55.

The gaps that remain between the transverse elements 59 of adjacent chain links 51 are closed-off by curved or arcuate cover elements 62. The two cover elements for closing off a space are secured, via clamping projections 63 formed thereon, in slots 64 of support elements 65. The latter, in turn, are mounted via a snap shaft 66 in a pivot hole 67 of the side pieces 52.

To center the cover elements 62 in the gaps between the transverse elements 59, both the edges of the transverse elements 59 as well as the edges of the cover elements 62 have formed thereon interengaging guide edges 68 and 69, with the guide edges 68 of the transverse elements 59 being directed inwardly, and with the guide edges 69 of the cover elements 62 being directed outwardly. Via the guide edges 68, 69, the cover elements 62 are always centrally aligned relative to the gaps, and in particular in the extended position via the guide edges 69 of those narrower cover elements 62 that are disposed inwardly in the curvature zone, and in the curved state via the guide edges 69 that are disposed on the wider cover elements 62 located outwardly in the curvature zone (FIG. 6).

The stop mechanism between the chain links of this second inventive variant for limiting the radius of curvature to the bending radius of the most sensitive energy line comprises stops 70 that are disposed in the same plane on one end of each side piece 52, and are directed toward one side, and also comprises similar stops 71 on the other end of each side piece 52 directed toward the other side. Disposed between the stops 70 and 71 are clearances 72, the size of which, as a function of the width of the stops 70, 71, determines the magnitude of the mutual pivot angle. The structural configuration and function of the stop mechanism can be seen in FIGS. 9 to 14.

The size of the stops 70, 71 is expediently such that a maximum pivot angle is possible between two adjacent chain links 51. This maximum pivot angle can then be reduced by inserting radial segmental pieces 73 (FIG. 10), thereby adapting the pivot angle to a given application.

The connection of two side pieces 52 is effected by a snap shaft 74, which at the same time serves as a receiving means for the snap shaft 66 of the cover elements 62.

Figures 15, 16:
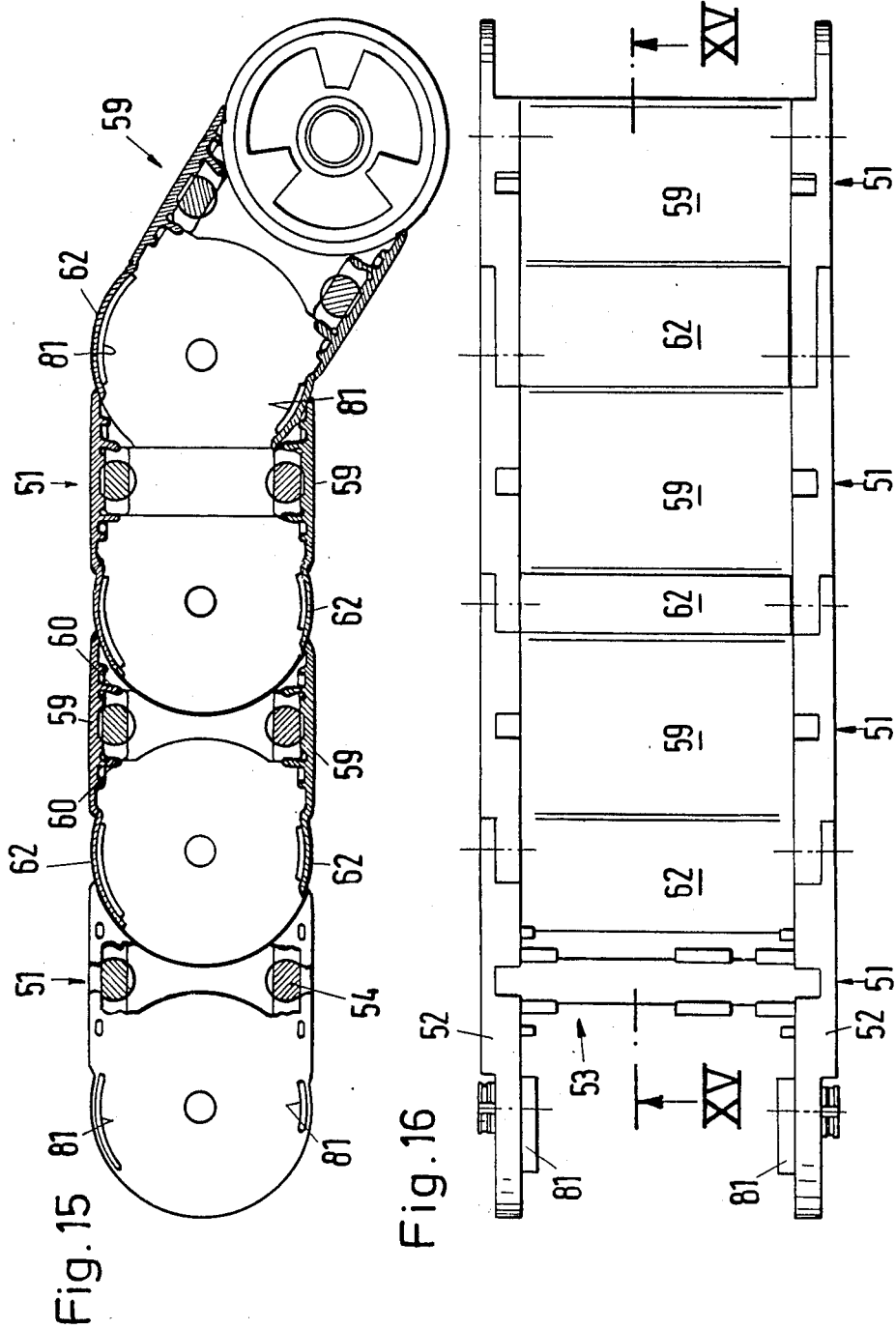
FIG. 15 is a cross-sectional view of four chain links of a third exemplary inventive variant, and is taken along the line XV—XV in FIG. 16.
FIG. 16 is a plan view of the chain links of FIG. 15.

FIGS. 15 and 16 illustrate a third inventive variant. The chain links 51 thereof have the same structural configuration as those of the previously described second variant, so that to this extent reference is made to the preceding description.

However, a further simplification consists in that the transverse elements 59 and cover elements 62 associated with a given chain link 51 are embodied as a single piece. For this reason, with this inventive variant the independent support elements 65 for the cover elements 62 can be eliminated. The support elements 65 are replaced by supporting strips 81 formed on the side pieces 52. Special structural measures for centering the transverse elements 59 and the formed-on cover elements 62 in the gaps of adjacent chain links are similarly not necessary.

The present invention is, of course, in no way restricted to the specific disclosure of the specification and drawings, but also encompasses any modifications within the scope of the appended claims.

What I claim is:

1. A guide chain for carrying lines that supply all types of expendable material from a fixed connection to a movable consuming device; said chain includes pivotably interconnected chain links, each of which comprises side pieces and crosspieces that interconnect the latter, with said side pieces and said crosspieces delimiting an interior space for accommodating said lines; the pivot movement of adjacent chain links is limited by radial stops that are pivotable in a given plane with cooperating stops of an adjacent chain link; said guide chain further comprises:
    transverse elements that are connected with said crosspieces to cover said chain links;
    curved cover elements disposed between said transverse elements of adjacent chain links; and
    support elements for connecting said cover elements between given adjacent chain links, with said support elements disposed radially relative to pivot axes of said chain links, and having a central shaft that is mounted in a pivot hole of said side pieces.

2. A guide chain according to claim 1, in which said transverse elements are made of extruded and profiled plastic on which are formed resilient tongues for insertion into said crosspieces.

3. A guide chain according to claim 1, in which said cover elements are made of extruded and profiled plastic on which are formed clamping projections that are received by said support elements.

4. A guide chain according to claim 1, in which edges of said transverse elements and said cover elements that face one another are provided with interengaging guide edges.

5. A guide chain according to claim 1, in which said central shaft of each support element is in the form of a snap shaft that is pivotably mounted in said pivot hole of a side piece.

6. A guide chain according to claim 5, in which said snap shafts of said support elements also form pivot shafts for adjacent ones of said chain links.

7. A guide chain according to claim 1, in which said transverse elements are made of extruded and profiled plastic on which are formed resilient tongues for insertion into separators disposed between the latter.

8. A guide chain according to claim 1, in which said transverse elements are inserts upon said crosspieces.

9. A guide chain according to claim 1, in which said transverse elements are formed by said crosspieces.

10. A guide chain for carrying lines that supply all types of expendable material from a fixed connection to a movable consuming device; said chain includes pivotably interconnected chain links, each of which comprises side pieces and crosspieces that interconnect the latter, with said side pieces and said crosspieces delimiting an interior space for accommodating said lines; the pivot movement of adjacent chain links is limited by radial stops that are pivotable in a given plane with cooperating stops of an adjacent chain link; said guide chain further comprises:
  transverse elements that are connected with said crosspieces to cover said chain links;
  respective curved cover elements formed on said transverse elements on one edge thereof that faces an adjacent chain link; and
  said transverse elements and cover elements being made of extruded and profiled plastic on which are formed resilient tongues for insertion into said crosspieces.

11. A guide chain according to claim 10, in which inner sides of said side pieces have formed thereon supporting strips for said cover elements.

12. A guide chain for carrying lines that supply all types of expendable material from a fixed connection to a movable consuming device; said chain includes pivotably interconnected chain links, each of which comprises side pieces and crosspieces that interconnect the latter, with said side pieces and said crosspieces delimiting an interior space for accommodating said lines; the pivot movement of adjacent chain links is limited by radial stops that are pivotable in a given plane with cooperating stops of an adjacent chain link; said guide chain further comprises:
  transverse elements that are connected with said crosspieces to cover said chain links; and
  respective circular cylindrical cover elements formed on said transverse elements on one edge thereof that faces an adjacent chain link; said transverse elements and cover elements are made of extruded and profiled plastic on which are formed resilient tongues for insertion into separators disposed between the latter.

13. A guide chain according to claim 17, in which inner sides of said side pieces have formed thereon supporting strips for said cover elements.

* * * * *